(12) United States Patent
Hofmann et al.

(10) Patent No.: US 12,476,421 B2
(45) Date of Patent: Nov. 18, 2025

(54) CONNECTOR

(71) Applicant: MD Elektronik GmbH, Waldkraiburg (DE)

(72) Inventors: Thomas Hofmann, Tacherting (DE); Lukas Hirschstetter, Edling (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 336 days.

(21) Appl. No.: 18/153,409

(22) Filed: Jan. 12, 2023

(65) Prior Publication Data

US 2023/0231341 A1 Jul. 20, 2023

(30) Foreign Application Priority Data

Jan. 20, 2022 (DE) .................. 10 2022 101 311.1

(51) Int. Cl.
 *H01R 13/627* (2006.01)
 *G02B 6/38* (2006.01)

(52) U.S. Cl.
 CPC ....... *H01R 13/6275* (2013.01); *G02B 6/3831* (2013.01); *H01R 13/6272* (2013.01)

(58) Field of Classification Search
 CPC ........... H01R 13/6275; H01R 13/6271; H01R 13/6273; G02B 6/3831
 USPC ................................................ 439/345, 352
 See application file for complete search history.

(56) References Cited

U.S. PATENT DOCUMENTS

| | | | | |
|---|---|---|---|---|
| 9,680,256 B1 | | 6/2017 | Lane et al. | |
| 10,116,095 B1 | * | 10/2018 | Sundarakrishnamachari | H01R 13/641 |
| 10,135,172 B1 | * | 11/2018 | Foltz | H01R 13/641 |
| 10,153,586 B1 | * | 12/2018 | Schroll | H01R 13/639 |
| 10,404,012 B1 | * | 9/2019 | Stoyanov | H01R 13/6272 |
| 10,505,314 B1 | * | 12/2019 | Yi | H01R 13/631 |
| 2004/0248453 A1 | * | 12/2004 | McLauchlan | H01R 13/6272 439/352 |
| 2010/0233897 A1 | * | 9/2010 | Seo | H01R 13/6272 439/345 |
| 2015/0270643 A1 | * | 9/2015 | Myer | H01R 13/6273 439/357 |

FOREIGN PATENT DOCUMENTS

| | | |
|---|---|---|
| EP | 1235311 A2 | 8/2002 |
| EP | 3120422 B1 | 7/2019 |
| WO | WO 2021182035 A1 | 9/2021 |

* cited by examiner

*Primary Examiner* — Gary F Paumen
(74) *Attorney, Agent, or Firm* — LEYDIG, VOIT & MAYER, LTD.

(57) ABSTRACT

A connector includes a housing insertable into a receptacle of a mating connector so as to form a connection and a connector position assurance (CPA) element which is movable relative to the housing between a pre-latching and a final latching position. The CPA element prevents the connection from becoming released in the final latching position. The connector further includes a retainer with a receptacle in a connection direction and an opening transverse thereto. The CPA element is insertable into the receptacle of the retainer. A protrusion is formed on the CPA element, wherein movement of the CPA element from the pre-latching to the final latching position is blocked in a case that the protrusion is engaged with the opening, and the movement of the CPA element is permitted in a case that the protrusion is not engaged with the opening.

15 Claims, 4 Drawing Sheets

CONNECTOR

CROSS REFERENCE TO RELATED APPLICATION

This application claims benefit to German Patent Application No. DE 10 2022 101 311.1, filed on Jan. 20, 2022, which is hereby incorporated by reference herein.

FIELD

The invention relates to a connector, a mating connector and a connector system for an electrical and/or optical connection.

BACKGROUND

Connectors are used to connect a conductor with at least one other conductor and/or a component, such as a printed circuit board. For the transmission of electrical signals with high data rates, USB connections are used in particular in the automotive sector. The connections, preferably comprising a connector and a suitable mating connector, which are used in a vehicle, must also have at least one Connector Position Assurance (CPA) element in addition to a so-called primary locking means, which ensures additional securing of the connection.

U.S. Pat. No. 9,680,256 B1 relates to a connector system including a CPA element. In this system, an electrical connector comprises a housing having a cavity, the cavity being adapted to receive therein a mating connector inserted along a mating axis, the housing including a first protrusion defining a hard stop surface. The electrical connector further includes a CPA element that is guidable into an inserted position on the housing in order to secure a connection between the electrical connector and an inserted mating connector. The hard stop surface on the housing thereby prevents the CPA element from being guided into the inserted position before a mating connector has first been inserted into the electrical connector.

The prior art electrical connector has at least the disadvantage that the hard stop surface, which extends transversely to the connection direction, must be formed inside the cavity. To produce such essentially punctiform protrusions in a cavity, complex undercuts are necessary, making production technically demanding, time-consuming and cost-intensive.

SUMMARY

In an embodiment, the present invention provides a connector including a housing insertable into a receptacle of a mating connector so as to form a connection and a connector position assurance (CPA) element which is movable relative to the housing at least between a pre-latching position and a final latching position. The CPA element prevents the connection between the connector and the mating connector from becoming released in the final latching position. The connector further includes a retainer with a receptacle in a connection direction and at least one opening transverse to the connection direction, the retainer being disposed on an outer surface of the housing, and the CPA element being insertable into the receptacle of the retainer. At least one first protrusion is formed on the CPA element, wherein movement of the CPA element from the pre-latching position to the final latching position is blocked in a case that the at least one first protrusion is engaged with the at least one opening on the retainer, and wherein the movement of the CPA element from the pre-latching position to the final latching position is permitted in a case that the at least one first protrusion is not engaged with the at least one opening on the retainer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
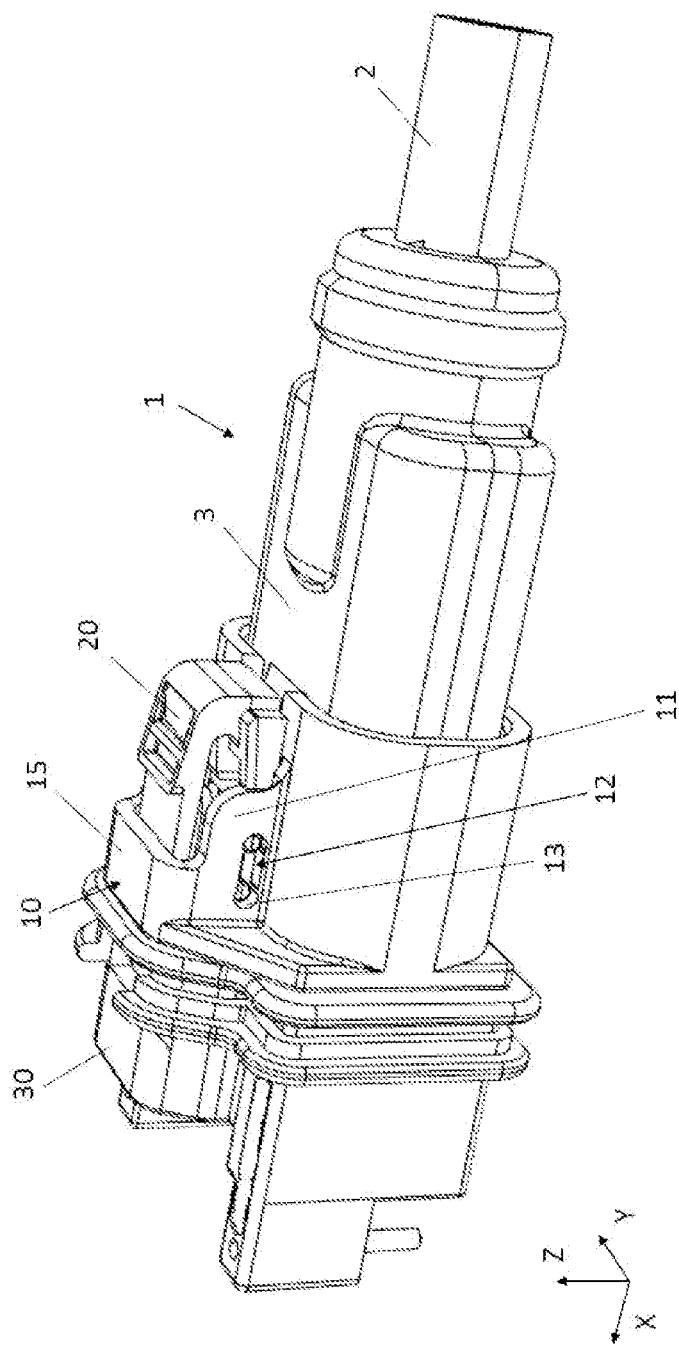
FIG. 1 shows a perspective view of an embodiment of a connector system with CPA element in the pre-latching position.

Embodiments of the present invention provide a connector, as well as a suitable mating connector, which meet the standard requirements in the automotive sector, such as having a CPA in addition to fastening means, and which are easy to manufacture.

In particular, an embodiment of the present invention provides a connector which meets the standard requirements in the automotive sector, such as having a CPA in addition to fastening means, and which is easy to manufacture, the connector having a housing which, for establishing a connection, can be inserted into a receptacle of a mating connector, a CPA element which can be moved relative to the housing, preferably along a connection direction, at least between a pre-latching position and a final latching position, the CPA element preventing the connection between connector and mating connector from becoming released in the final latching position, a retainer having a receptacle in the connection direction and at least one opening transverse to the connection direction wherein the retainer is disposed on an outer surface of the housing, and the CPA element is insertable into the receptacle, and at least one first protrusion is formed on the CPA element, wherein movement of the CPA element from the pre-latching position to the final latching position is blocked when the at least one first protrusion is engaged with the at least one opening on the retainer, and the movement is possible when the at least one first protrusion is not engaged with the at least one opening on the retainer.

The connector according to an embodiment of the present invention uses the male connector component rather than, as in the prior art, the female connector component as the basis for connecting the connector component and the CPA element. In addition, blocking protrusions, which extend in particular transversely to a connection direction of connector and mating connector, are not formed on the housing of the connector component as in the prior art, but rather on the CPA element. These structural differences as compared to the prior art allow protrusions to be formed at freely accessible locations, and avoid forming protrusions and/or recesses within receptacles or cavities on the connector component, which is much more complex. Furthermore, openings are only required on the connector into which the protrusions on the CPA element can engage in a pre-latching position so as to hold the CPA element on the connector, to guide it, and to only allow it to move to a final latching position when a suitable mating connector is connected to the connector. Due to the outwardly open structures, the connector components, i.e. connector and suitable mating connector, and also the CPA element can be more easily manufactured. Preferably, the connector components as well as the CPA element are produced by injection molding. Injection molding processes offer advantages, particularly from structural-mechanical and economic points of view. For example, aging effects that occur in 3D printed components due to the nature of the 3D printing materials can be avoided. In addition, using injection molding the components can be produced with the required mechanical strength properties. A 3D printing process is essentially only used when prototypes are to be created. The present components have been designed in such a way that the construction of corresponding injection molds can be kept simple. This type of production saves time and costs.

Preferably, the retainer comprises a bracket element, the bracket element forming the receptacle into which the CPA element is insertable, and the bracket element preferably encloses parts of a fastener (also referred to herein as fastening means) on the connector for fastening connector and mating connector. The bracket element thus performs multiple functions simultaneously, which is space-saving and efficient. The receptacle, which is formed essentially only by the bracket element, forms a very large opening, so that disposing of a CPA element in the receptacle is easy. There is no need for difficult insertion as would be the case in a narrower opening. The bracket element further protects at least a portion of the fastening means from external influences. In particular, the bracket element protects the tab on the fastening means from unintentional actuation.

Preferably, the CPA element has a lip that is configurated to actuate the fastening means on the connector for releasing the connection between the connector and the mating connector. The lip allows the tab on the fastening means to be actuated even when the tab is enclosed or covered by the bracket element from the outside. No tool is required to release the connection between connector and mating connector in the pre-latching position.

Preferably, the CPA element has two, preferably parallel, arms which, when the CPA element is in the pre-latching position, extend in the direction of a contact opening of the connector, each having at least one first protrusion, the two arms being deflectable transversely to the connection direction when the connector is connected to a mating connector, thereby releasing the engagement of the respective first protrusions from the respective openings in the retainer so that the CPA element can be moved into a final latching position. The arrangement of two arms provides a redundancy, since it is not possible to move the CPA element from the pre-latching position to the final locking position, even with only one arm, without connecting a suitable mating connector to the connector. Furthermore, the two arms preferably extend over an entire width of the CPA element so that wedging is prevented when the CPA element is inserted into the retainer.

Preferably, the CPA element has at least one second protrusion that protrudes further from the CPA element by a difference in length in the same direction as the at least one first protrusion. The difference in length ensures that the second protrusion is not disengaged from the opening in which it is disposed, neither in the pre-latching position nor in the final latching position. The second protrusion forms a guide for the CPA element.

Preferably, the at least one second protrusion is located in the at least one opening at a first position in the pre-latching position and at a second position in the final latching position, wherein the at least one second protrusion prevents further movement of the CPA element in the connection direction in the second position. In the pre-latching position, the at least one second protrusion is disposed at the first position at an end of the opening opposite the stop surface. In this position, the second protrusion prevents the CPA element from moving out of the retainer in a direction opposite to the connection direction. In the second position, the second protrusion rests against the stop surface and prevents the CPA element from moving further in the connection direction. Thus, unintentional further movement of the CPA element in the direction of the mating connector can be prevented even when a large force is applied.

Preferably, the at least one first protrusion is restrained from movement in both directions along the connection direction in the pre-latching position, in particular by a stop surface and a latch (also referred to herein as latching means). This structure secures the CPA element in its position. However, the latching means can be overcome with a moderate force to deliberately change the position of the CPA element.

Preferably, the connector comprises a male connector for an electrical and/or optical connection. A male connector is the counterpart to a female connector. The male connector is essentially formed from a hollow cylinder on which superstructures or protrusions are formed for additional functions. Connector components with the same function typically have to be designed differently depending on whether they are disposed on the male or female connector.

In another embodiment, the present invention provides a mating connector which meets the standard requirements in the automotive sector, such as having a CPA in addition to fastening means, and which is easy to manufacture, the mating connector comprising a housing forming a receptacle into which a connector is at least partially insertable, at least one protrusion disposed in the receptacle and capable of moving at least parts of an inserted CPA element on the connector transversely to a connection direction, the at least one protrusion forming part of the inner wall of the receptacle. The feature that the protrusion is a part of the inner wall means that the protrusion on the inner wall extends along the connection direction and is not just a punctiform elevation. As a result, the protrusion can be formed simply by designing or shaping the inner wall of the receptacle without having to form additional undercuts or the like. This structure facilitates the manufacturing of corresponding injection molds and, in particular, enables the mating connector to be produced in an injection molding process.

In a further embodiment, the present invention provides a connector system comprising at least one connector and one mating connector, which meet the standard requirements in the automotive sector, such as having a CPA in addition to fastening means, and which are easy to manufacture. The connector and the mating connector form a connection for electrical and/or optical signals in the assembled state. The connection is fastened at least by fastening means and further secured by a CPA element. Thus, the connection is robust and secure against unintentional loosening. The components are easy to manufacture due to their structure.

FIG. 1 shows an exemplary embodiment of a connector system in the mated state. In the illustrated embodiment, the connector system has a connector 1 and a mating connector 30. The connector 1 and the mating connector 30 were connected to each other along a connection direction X, i.e., a part of the connector 1 was inserted into a receptacle 32 on the mating connector 30. The connector 1 is also referred to as a male connector. The mating connector 30 is also referred to as a female connector or socket.

The connector 1 and the mating connector 30 also have corresponding fastening means 7. The fastening means 7 on the connector 1 are formed as a protrusion on the housing 3 of the connector 1. In the illustrated exemplary embodiment, the fastening means 7 on the connector 1 comprises at least one latching nose 8 and on the mating connector 30 comprises a matching opening 38 into which the latching nose 8 can engage to form a latching connection when the connection is made. The latching connection enables a quick, durable and releasable means of securing. The latching connection is also referred to as the primary locking means between connector 1 and mating connector 30. The connection is further secured against accidental release by a CPA element 20. The CPA element 20 is a type of locking element for the latching connection. The CPA element 20, when attached to the retainer 10 of the connector 1, is movable, preferably slidable, between a pre-latching position and a final latching position along the connection direction X. In this regard, the CPA element 20 is configured such that it is only slidable from the pre-latching position to the final latching position when the connector 1 with a predetermined section in the vicinity of the contact opening 4 is fully located in the mating connector 30. When the connector 1 has been mated with the mating connector 30, as just described, and the CPA element 20 has subsequently been moved from the pre-latching position to the final latching position, the connector 1 has a blocking effect on the latching connection between the connector 1 and the mating connector 30 via the CPA element 20. By locking with the CPA element 20, an erroneous release of the latching connection can be prevented. After the CPA element 20 has been moved back from the final latching position to the pre-latching position, the latching connection can be released by actuating the tab 9, which is done indirectly by actuating the actuating surface 28 on the CPA element 20.

Figure 2:
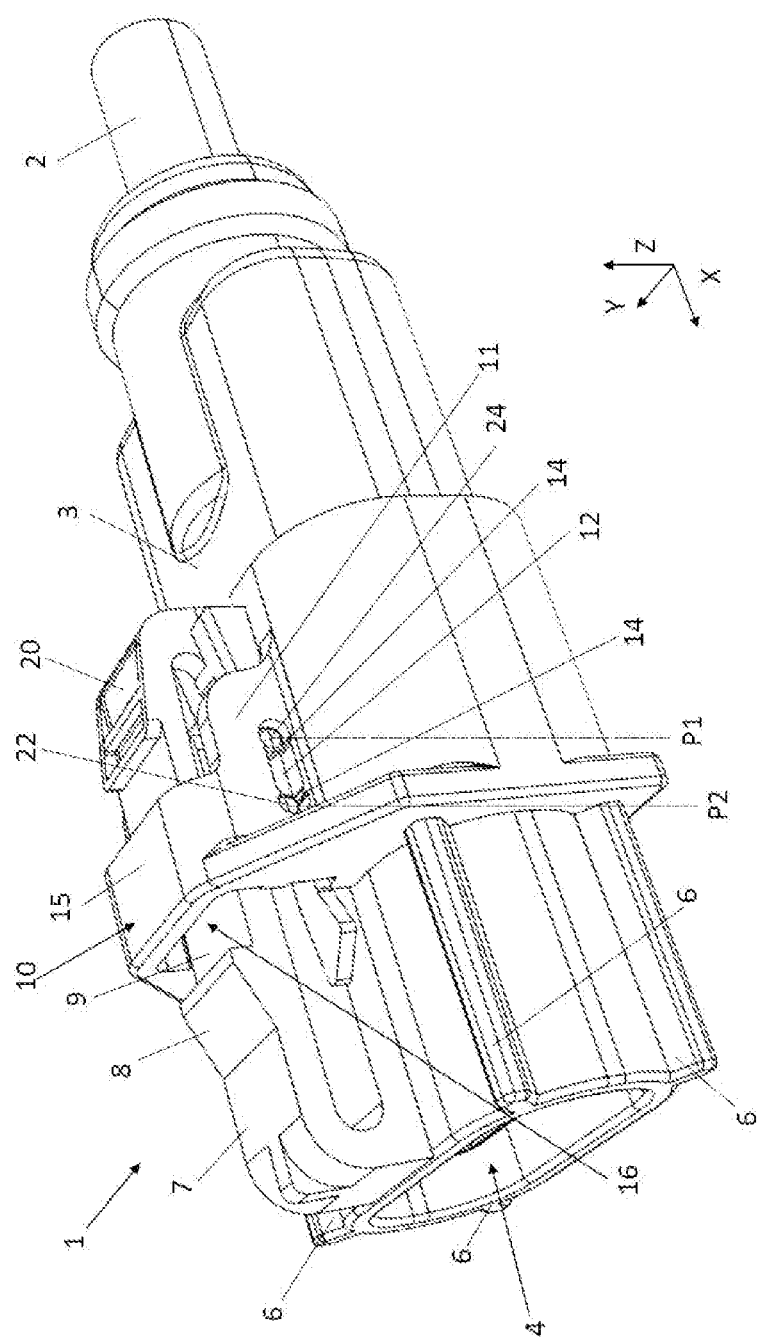
FIG. 2 shows a perspective view of an embodiment of a connector with a CPA element in the pre-latching position.

FIG. 2 shows an exemplary embodiment of a connector 1. The connector 1 comprises a male connector for an electrical and/or optical connection. In the illustrated exemplary embodiment, the connector 1 comprises contact elements for a USB connection (cf. contact openings 4, 34 in FIGS. 2 and 4). In alternative embodiments, the connector 1 may comprise contact elements for other connections. The illustrated connector 1 is connected to a conductor 2 for transmitting signals.

The connector 1 has a housing 3. The housing 3 is essentially a hollow cylinder component. The housing 3 is disposed to be inserted into a receptacle 32 on the mating connector 30 for establishing a connection of the connector 1 with a mating connector 30. To ensure that only a suitable mating connector 30 can be connected to the connector 1, the housing preferably has a coding 6 in the vicinity of the contact opening 4. The coding 6 matches a complementary coding 36 on a matching mating connector 30. In FIG. 2, the coding 6 is shown by four protrusions extending from the housing 3 at the contact opening 4. In alternative embodiments, the number and shape of the coding 6 may vary.

The housing 3 further comprises a retainer 10 having a receptacle 16 in the connection direction X and at least one opening 12 transverse to the connection direction X. The retainer 10 is disposed on an outer surface of the housing 3. The retainer 10 is preferably located on one side of the housing 3, but in alternative embodiments could extend over or be disposed on two or more sides. The retainer 10 comprises a bracket element 15. In addition to two protrusions 11, which are preferably disposed on the housing 3 in the connection direction X, the bracket element 15 connects the two protrusions 11 and forms the receptacle 16. The CPA element 20 can be inserted into the receptacle 16. The insertion step preferably takes place during pre-assembly. During final assembly of the connector 1, for example in a vehicle, the CPA element 20 is preferably already disposed on the connector 1 via the retainer 10. The bracket element 15 of the retainer 10 preferably encloses parts of the fastening means 7, for fastening the connector 1 and the mating connector 30, on the connector 1. In particular, the tab 9, for releasing the connection, is disposed below the bracket element 15 or between the bracket element 15 and the surface of the housing. Due to this arrangement, the retainer 10 protects the fastening means 7, in particular the tab 9, from unintentional actuation and generally from external influences. In the exemplary embodiment shown in FIG. 2, the at least one opening 12 is formed in a protrusion 11 of the retainer 10. Preferably, at least one opening 12 is formed in each of the protrusions 11 of the retainer 10. The shape and size of the opening 12 is adapted to the first protrusions 22, which can be engaged with and disengaged from the opening 12. The opening 12 includes at least one stop surface 13 against which a first protrusion 22 rests in the opening 12 in the pre-latching position. In the pre-latching position the stop surface 13 prevents movement of the CPA element 20 along the connection direction X into the final latching position, when at least a first projection 22 of the CPA element 20 is in engagement with an opening 12. An unwanted movement of the CPA element in the opposite direction, i.e. away from the contact opening 4 of the connector 1, can be prevented by at least one latching means 14. In one exemplary embodiment, the latching means 14 is a small elevation or protrusion. With a small force caused by a definite intentional movement, the latching means 14 can be overcome by the CPA element 20. The opening 12 may include further latching means 14, for example additional latching means 14, for a second protrusion 24 on the CPA element 20.

The connector 1 is formed in particular from plastic. The connector 1 can be produced using known manufacturing processes. The connector 1 can be produced as a molded component in a separate step and then mounted on the conductor 2, or formed directly on the conductor 2 by overmolding. In particular, the coding 6, the fastening means 7 and the retainer 10 may be attached and/or formed in separate steps on the housing 3, as separate components by assembly or by overmolding, or may be created in one process with the housing 3. All structures on the connector 1 include protrusions or openings that are freely accessible, i.e., in particular, the protrusions are not disposed within cavities or recesses. Due to this structure, the connector 1 can be easily produced using known manufacturing processes, in particular without having to form complex undercuts. In addition, the connector 1 can also be produced using 3D printing processes.

The connector 1 further comprises a CPA element 20. The CPA element 20 is in particular a separate component. The CPA element 20 is preferably constructed in mirror symmetry with respect to a mirror axis. The symmetry simplifies the construction or the manufacture and use. As already described, the CPA element 20 is insertable into the receptacle 16 on the connector 1 and can be held there. The CPA element 20 is preferably disposed in a pre-latching position in the retainer 10 during a pre-assembly of the connector 1. The CPA element 20 is movable relative to the housing 3, preferably along the connection direction X, at least between a pre-latching position and a final latching position. The CPA element 20 has the function of a locking element for the fastening means 7 on the connector 1. In the final latching position, the CPA element 20 prevents the connection between the connector 1 and the mating connector 30 from becoming disconnected.

Figure 3:
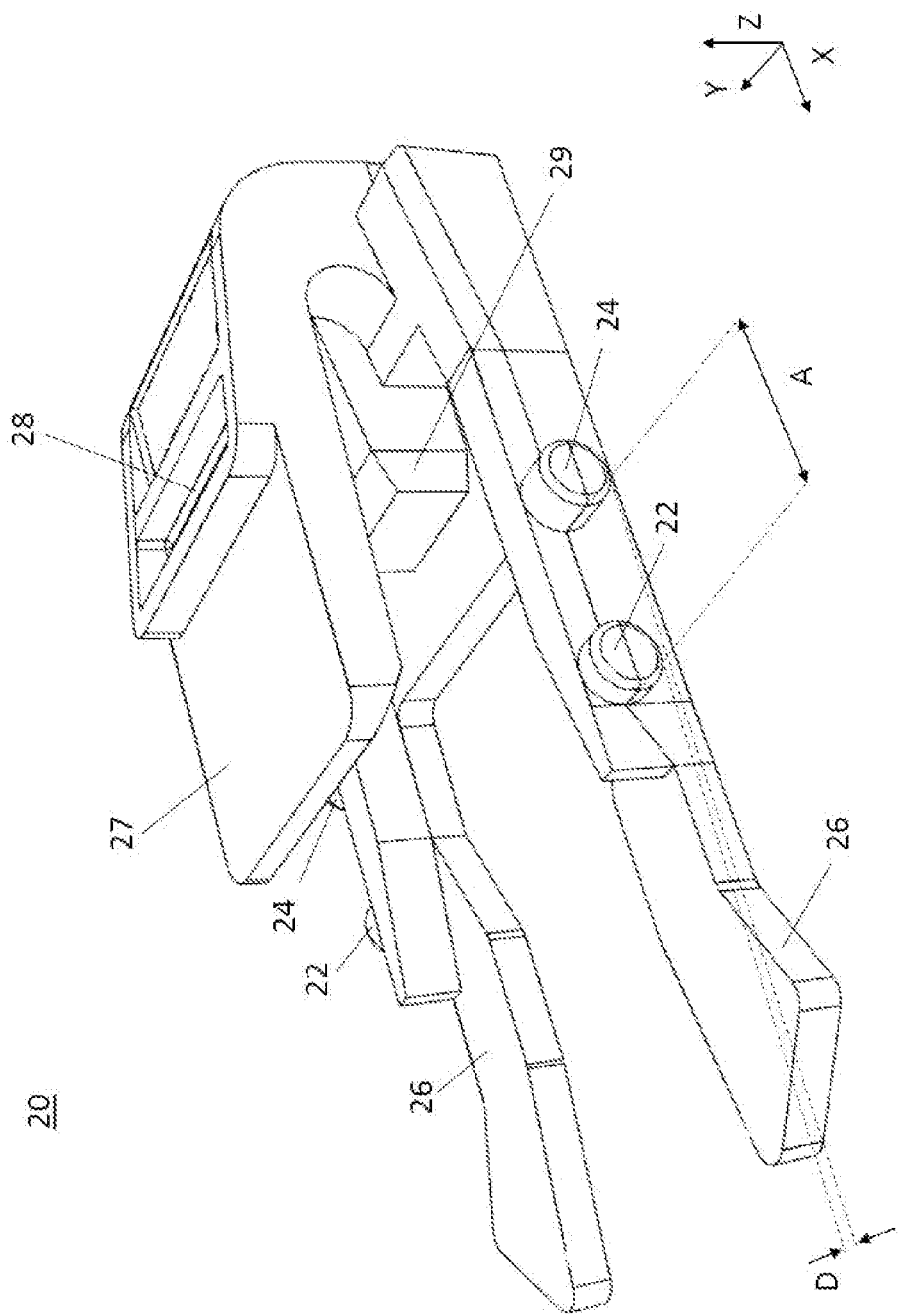
FIG. 3 shows a perspective view of an embodiment of a CPA element.

An exemplary embodiment of a CPA element 20 is shown separately in FIG. 3. The illustrated CPA element 20 has at least two arms 26. The two arms 26 are elastically formed and/or held. The arms 26 are deflected transversely to the connection direction X, in particular perpendicularly and towards each other, when the connector 1 is inserted into the mating connector 30. At their outer exposed ends, the two arms 26 have beveled shapes, in particular edges. The design of the edges is adapted in such a way that it deflects the arms 26 in a certain direction when colliding with other components, for example a mating connector 30. In the illustrated exemplary embodiment, the arms 26 are to be moved towards each other when colliding with a mating connector 30.

At least one first protrusion 22 is formed on each arm 26. The first protrusions 22 are engaged with a respective opening 12 on the retainer 10 of the connector 1 in the pre-latching position. The first protrusions 22 block movement of the CPA element 20 from the pre-latching position to the final latching position when the connector 1 and the mating connector 30 are in the non-mated or unconnected state. Only in the mated or connected state is the blockage removed. The deflection of the arms 26 during mating or connecting causes the first protrusions 22 on the arms 26 to deflect inwardly, allowing them to be released from engagement with the respective opening 12. When the first protrusions 22 are disengaged, the CPA element 20 can be moved to the final latching position.

In the exemplary embodiment shown in FIG. 3, the CPA element 20 has at least one second protrusion 24 on each arm 26. Each second protrusion 24 protrudes in the same direction on the same arm 26, in particular transversely to the connection direction X, as the respective first protrusion 22 on the same arm 26. Each second protrusion 24 thereby protrudes by a length difference D further from the CPA element 20 than the at least one first projection 22. The length difference D is preferably in the range of a few millimeters, and is adjusted so that deflection of the arms 26 cannot cause the second protrusions 24 to disengage from the opening 12. The second protrusions 24 serve as a guide for the CPA element 20. Each of first and second protrusions 22, 24 on one side of the CPA element 20 are disposed offset by a distance A in the connection direction X. The distance A corresponds to the length by which the CPA element 20 is moved from the pre-latching position to the final latching position. In the exemplary embodiment shown in FIGS. 1 and 2, each second protrusion 24 is located at a first position P1 in the pre-latching position and at a second position P2 in the respective opening 12 in the final latching position. When the second protrusions 24 are disposed in the second position P2, they prevent further movement of the CPA element 20 in the connection direction X.

The CPA element further comprises a stopper 29. In the final latching position the stopper 29 is disposed between the tab 9 of the fastening means 7 on the connector 1 and the housing surface and prevents actuation of the tab 9. Thus, the CPA element 20 locks the fastening means 7 or the primary locking means and unintentional release is prevented.

Furthermore, the CPA element 20 has a lip 27. The lip 27 is designed to actuate the fastening means 7 on the connector 1 for releasing the connection between the connector 1 and the mating connector 30. The lip 27 is disposed between the bracket element 15 and the tab 9 in both the pre-latching and the final latching positions. The lip 27 can only be deflected or actuated in the pre-latching position. In the final latching position, the lip 27 would press on the tab 9 when deflected in the direction of the housing 3, the tab 9 being thereby inhibited from moving by the stopper 29. The lip 27 is moved by means of the actuating surface 28. The actuating surface 28 is exposed and can easily be reached or actuated by assembly personnel. When the actuating surface 28 is actuated in the direction of the housing 3, the lip 27 and thereby also the tab 9 are moved in the direction of the housing 3, allowing the connection between connector 1 and mating connector 30 to be released.

The actuating surface 28 further forms a stop in the final latching position for limiting movement of the lip 27 or the CPA element 20 in the connection direction X. The abutment of the actuating surface 28 against the retainer 10, and in particular against the bracket element 15, can be used as visual feedback that the CPA element 20 is in the final latching position.

Figure 4:
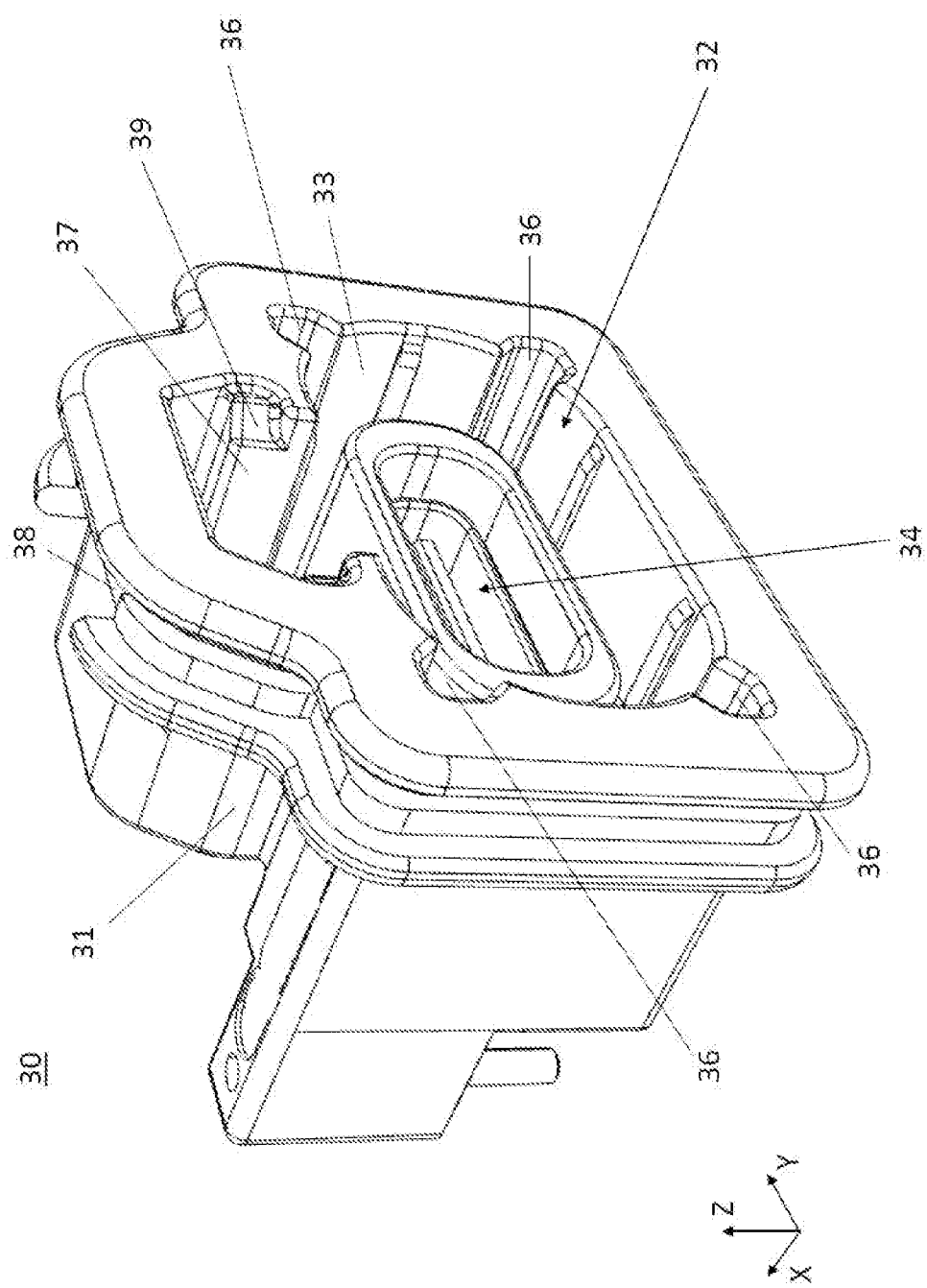
FIG. 4 shows a perspective view of an embodiment of a mating connector.

FIG. 4 shows an exemplary embodiment of a mating connector 30. The mating connector 30 has a housing 31 forming a receptacle 32 into which a connector 1 is insertable. The connector 1 is inserted into the mating connector 30 for a complete connection around a predetermined section in the vicinity of the contact opening 4 and is then fastened to the mating connector 30, in particular to the opening 38 via the fastening means 7, in particular via the latching nose 8.

The mating connector 30 includes at least one protrusion 37 disposed in the receptacle 32. In the illustrated exemplary embodiment, the receptacle 32 includes two opposing protrusions 37. Generally, the number of protrusions 37 is matched to the number of arms 26 on the CPA element 20. When the connector 1 and the mating connector 30 are mated, the protrusions 37 move the two arms 26 of the inserted CPA element 20 on the connector 1 transversely to the connection direction X, in particular towards each other, so that the CPA element 20, as already described, can be moved from a pre-latching position to a final latching position. At the open end of the receptacle 32, the protrusions 37 may have guides 39 that facilitate the mating of the connector 1 and mating connector 30. The two protrusions 37 are part of the inner wall 33 of the receptacle. In particular, the protrusions 37 extend in the connection direction in the receptacle 32, rather than transversely.

The mating connector 30 is preferably formed from plastic. The mating connector 30 can be produced using known manufacturing processes, in particular injection molding processes. All structures, and in particular the protrusions 37, on the mating connector 1 can be formed without complex undercuts within recesses and cavities using known manufacturing processes. Thus, the mating connector 30 can be easily manufactured.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 connector
2 conductor
3 housing
4 contact opening
6 coding
7 fastening means
8 latching nose
9 tab
10 retainer
11 protrusion
12 opening
13 stop surface
14 latching means
15 bracket element
16 receptacle
20 CPA element
22 first protrusion
24 second protrusion
26 arm
27 lip
28 actuating surface
29 stopper
30 mating connector
31 housing
32 receptacle
33 inner wall
34 contact opening
36 coding
37 protrusion
38 opening
39 guide
A distance
D length difference
P1 first position
P2 second position
X, Y, Z coordinate axes

What is claimed is:

1. A connector, comprising:
   a housing insertable into a receptacle of a mating connector so as to form a connection;
   a connector position assurance (CPA) element which is movable relative to the housing at least between a pre-latching position and a final latching position, the CPA element preventing the connection between the connector and the mating connector from becoming released in the final latching position,
   wherein the CPA element includes arms each having a sliding surface protruding laterally outward relative to a connection direction;
   a retainer with a receptacle in the connection direction and at least one opening transverse to the connection direction, the retainer being disposed on an outer surface of the housing, and the CPA element being insertable into the receptacle of the retainer; and
   at least one first protrusion formed on the CPA element, wherein movement of the CPA element from the pre-latching position to the final latching position is blocked in a case that the at least one first protrusion is engaged with the at least one opening on the retainer, and wherein the movement of the CPA element from the pre-latching position to the final latching position is permitted in a case that the at least one first protrusion is not engaged with the at least one opening on the retainer,
   wherein the sliding surface and the at least one first protrusion of a respective arm are separated in the connection direction by a distance such that the sliding surface and the at least one first protrusion separately protrude laterally outward relative to the respective arm.

2. The connector as recited in claim 1, wherein the CPA element is movable relative to the housing between the pre-latching position and the final latching position along the connection direction.

3. The connector as recited in claim 1, wherein the retainer comprises a bracket element forming the receptacle into which the CPA element is insertable.

4. The connector as recited in claim 3, wherein the bracket element encloses parts of a fastener on the connector configured to fasten the connector and the mating connector.

5. The connector as recited in claim 3, wherein the CPA element comprises a lip configured to actuate the fastener on the connector so as to release the connection between the connector and the mating connector.

6. The connector as recited in claim 1, wherein the CPA element has two arms which, in the pre-latching position of the CPA element, extend in a direction of a contact opening of the connector, each of the two arms having at least one first protrusion, and wherein the two arms, in a connected state of the connector with the mating connector, are deflectable transversely to the connection direction so as to disengage the respective first protrusions from respective openings in the retainer so that the CPA element is movable into the final latching position.

7. The connector as recited in claim 6, wherein the two arms of the CPA element are parallel to each other.

8. The connector as recited in claim 1, wherein the CPA element comprises at least one second protrusion protruding further from the CPA element than the at least one first protrusion in a same direction by a length difference.

9. The connector as recited in claim 8, wherein the at least one second protrusion is located in the at least one opening at a first position in the pre-latching position and at a second position in the final latching position, and wherein the at least one second protrusion prevents further movement of the CPA element in the connection direction in the second position.

10. The connector as recited in claim 1, wherein the at least one first protrusion is inhibited from movement in both directions along the connection direction in the pre-latching position by a stop surface and a latch.

11. The connector as recited in claim 1, wherein the connector comprises a male connector for an electrical and/or optical connection.

12. A connector system, comprising:
the connector as recited in claim 1; and
a mating connector, comprising:
  a mating connector housing forming a receptacle into which the connector is at least partially insertable; and
  at least one protrusion which is disposed in the receptacle and which is configured to move at least parts of the CPA element of the connector inserted therein transversely to the connection direction, wherein the at least one protrusion forms part of an inner wall of the receptacle.

13. The connector as recited in claim 1, wherein the at least one first protrusion is cylindrical and is configured to engage form-fittingly with a semi-circular surface of the at least one opening.

14. The connector as recited in claim 8, wherein the at least one first protrusion and the at least one second protrusion are cylindrical and are each configured to engage form-fittingly with semi-circular surfaces at opposing ends of the at least one opening.

15. A mating connector, comprising:
a housing forming a receptacle into which a connector is at least partially insertable;
at least one protrusion which is disposed in the receptacle and which is configured to move at least parts of an inserted connector position assurance (CPA) element on the connector transversely to a connection direction, wherein the at least one protrusion forms part of an inner wall of the receptacle;
a connector housing insertable into the receptacle of the mating connector so as to form a connection;
the CPA element which is movable relative to the connector housing at least between a pre-latching position and a final latching position, the CPA element preventing the connection between the connector and the mating connector from becoming released in the final latching position;
a retainer with a receptacle in a connection direction and at least one opening transverse to the connection direction, the retainer being disposed on an outer surface of the connector housing, and the CPA element being insertable into the receptacle of the retainer; and
at least one first protrusion formed on the CPA element, wherein movement of the CPA element from the pre-latching position to the final latching position is blocked in a case that the at least one first protrusion is engaged with the at least one opening on the retainer, and wherein the movement of the CPA element from the pre-latching position to the final latching position is permitted in a case that the at least one first protrusion is not engaged with the at least one opening on the retainer,
wherein the receptable is configured to receive the mating connector,
wherein the CPA element includes arms each having a sliding surface protruding laterally outward relative to a connection direction, and
wherein the sliding surface and the at least one first protrusion of a respective arm are separated in the connection direction by a distance such that the sliding surface and the at least one first protrusion separately protrude laterally outward relative to the respective arm.

* * * * *